(12) United States Patent
Boyd et al.

(10) Patent No.: US 6,965,594 B2
(45) Date of Patent: Nov. 15, 2005

(54) INTERNET ASSISTED MOBILE CALLING

(75) Inventors: Ralph Warren Boyd, Southwest Ranches, FL (US); Javier R. Rivera, Sunrise, FL (US); Patrick J. Doran, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/261,333

(22) Filed: Sep. 30, 2002

(65) Prior Publication Data

US 2004/0062223 A1   Apr. 1, 2004

(51) Int. Cl.[7] .................. H04L 12/66; H04L 12/28; H04M 1/00
(52) U.S. Cl. .................. 370/352; 370/401; 455/560
(58) Field of Search .................. 370/338, 352–356, 370/389, 392, 401, 466

(56) References Cited

U.S. PATENT DOCUMENTS

| | | | | |
|---|---|---|---|---|
| 5,953,322 | A * | 9/1999 | Kimball .................. | 370/328 |
| 6,052,725 | A * | 4/2000 | McCann et al. .......... | 709/223 |
| 6,577,637 | B1 * | 6/2003 | Sieppi .................. | 370/401 |
| 6,608,832 | B2 * | 8/2003 | Forslow .................. | 370/353 |
| 6,614,774 | B1 * | 9/2003 | Wang .................. | 370/338 |
| 6,636,596 | B1 * | 10/2003 | Gallant et al. .......... | 379/220.01 |
| 6,683,871 | B1 * | 1/2004 | Lee et al. .................. | 370/356 |
| 6,795,444 | B1 * | 9/2004 | Vo et al. .................. | 370/401 |
| 2002/0176379 | A1 * | 11/2002 | Wallenius et al. .......... | 370/328 |
| 2004/0120502 | A1 * | 6/2004 | Strathmeyer et al. .. | 379/265.01 |
| 2005/0086706 | A1 * | 4/2005 | Kasamatsu et al. .......... | 725/139 |
| 2005/0135339 | A1 * | 6/2005 | Vargo et al. .................. | 370/352 |

* cited by examiner

*Primary Examiner*—Hassan Kizou
*Assistant Examiner*—Hong Sol Cho
(74) *Attorney, Agent, or Firm*—Scott M. Garrett

(57) ABSTRACT

An initiating mobile station (102) subscribes to a wireless communication system (109) for mobile communication service. A wireless remote access server (WRAS) (118) interacts with the wireless communication system as a subscribing mobile station would, but provides network connectivity to data information network, such as the Internet (108). The WRAS includes radio devices (120, 122) for communicating with the wireless communication system, and network control and routing (124). The WRAS sets up a network session with the target (104 or 106) to facilitate communication between the initiating mobile station and the target, via the wireless communication system and the network.

5 Claims, 3 Drawing Sheets

INTERNET ASSISTED MOBILE CALLING

TECHNICAL FIELD

This invention relates in general to wireless communication systems, and more particularly to coupling wireless communication systems to network environments, such as the Internet, to carry voice signals over such networks.

BACKGROUND OF THE INVENTION

Wireless communication systems have been deployed in virtually all metropolitan areas of the world. Likewise, access to the Internet has also increased in popularity. Each of these systems facilitate communication between users of the same systems, but there has been somewhat of a barrier in voice communication between users of one system with users of the other system. Voice communication over the public Internet between computer users is presently available and somewhat widely practiced.

A primary concern for connecting the two systems to facilitate voice communication between users of one system with users of another system is the difference in the way voice data is transmitted. In standard telephone communication voice signals are band limited to about 4 Khz and then digitized and encoded using pulse code modulation (PCM). This produces a stream of data that can be transmitted from one point to another point over a public switched telephone network, for example. In digital wireless systems more aggressive compression encoding schemes are used such as, for example, vector sum excited linear predictive coding (VSELP).

Mobile wireless systems already interface with public switched telephone networks, so a conversion from the compression used to carry the wireless signal to PCM, and vice-versa, is already in use. Making local calls with wireless phones usually only incurs an air time charge, and most long distance calls still incur a long distance charge. The use of so called voice over IP telephone software used to connect two internet users for voice communication circumvents such long distance charges, but wireless phone users have no such option. Therefore there is a need for which users of wireless and mobile communication devices can connect with other remote users over the Internet.

DETAILED DESCRIPTION OF A PREFERRED EMBODIMENT

Figure 1:
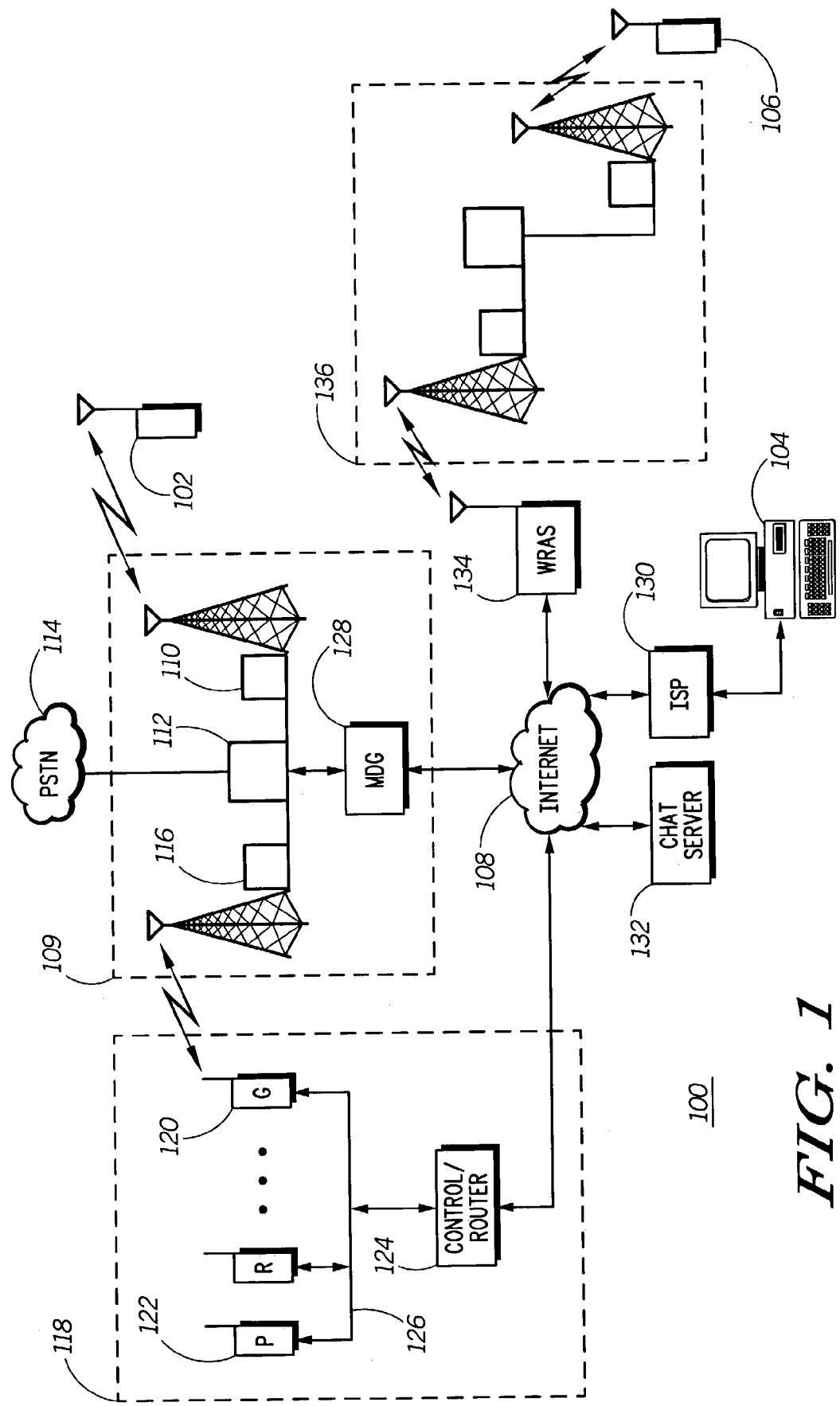
FIG. 1 shows a block diagram of a communication system for voice over internet communication.

While the specification concludes with claims defining the features of the invention that are regarded as novel, it is believed that the invention will be better understood from a consideration of the following description in conjunction with the drawing figures, in which like reference numerals are carried forward.

The invention solves the problem by use of wireless remote access servers (WRAS). A WRAS comprises a gateway radio and several proxy radios which communicate with the local wireless service infrastructure equipment in the same manner as typical subscriber units. This makes it possible for other subscriber units to communicate with the WRAS radios the same way a person using one cellular phone can call another person using another cellular phone. However, the radios used in the WRAS are designed to route data to a router in the WRAS, which is connected to the Internet. The router sends the voice data to the target device, such as a personal computer, and may also receive voice data from the target and route it to a proxy radio which transmits the information over the wireless service infrastructure to the subscriber. Distinct variations of this method also produce similar results.

Referring now to FIG. 1, there is shown a block diagram of a communication system 100 for facilitating voice-over-internet communication between the user of a communication device and a second party. The system allows the user of a portable communication device or mobile station 102 to speak with the user of a computer 104, or another mobile station 106 by means of the Internet 108 or a similar network. As is well practiced in the art, the mobile station communicates with a fixed equipment network 109 including a base station 110. The fixed equipment network is operated by a wireless communication service provider and it provides wireless communication service to subscribers, such as mobile station 102. A base station establishes a serving cell in the vicinity of the base station, and mobile stations within that serving area or cell communicate with the base station over an air interface. When the mobile station moves into another adjacent serving area, the interface to the mobile station is handed off to the base station serving the new serving area. The base stations are operatively connected to a central operations office 112. The central operations office comprises various and well known telecommunications equipment, such as a home location register, a visitor location register, and a mobile switching center for connecting wireless mobile station users to the public switched telephone network (PSTN) 114, as well as establishing calls between mobile stations. It is known in such wireless communication systems that the user of a first mobile station in a first serving area, such that established by base station 110, can communicate with another user in a second serving area established by a second base station 116.

To facilitate communication between a user of a mobile station and an internet client, the invention provides a wireless remote access server (WRAS) 118. The WRAS is a communication processing agent that, from the perspective of the wireless communication system, behaves as a mobile station, and to network entities connected to the Internet behaves like many network entities. It is an interface point between the wireless communication system and the Internet that requires no change in the fixed equipment network of the wireless communications system. Although numerous variations of the configuration of a WRAS may occur to those skilled in the art, the preferred embodiment of a WRAS comprises at least one gateway radio 120, and at least one proxy radio 122, but preferably a plurality of proxy radios. The gateway and proxy radios are similar to the mobile station operated by a typical user; it has a similar transceiver design, and is capable of communication using the particular air interface of the local base station 116, although it is not necessary that the mobile station 102 and WRAS 118 be in different serving areas. In the preferred embodiment, the gateway and proxy radios are subscribers to a wireless communication service, as is the mobile station 102, and the WRAS is operated by a third party other than the wireless communication service provider. Thus, as far as the central operations office 112 is concerned, each of the gateway and proxy radios are regular subscriber mobile stations, and use system resources in the same manner and the fact that they are gateway and proxy radios operating as part of a WRAS is immaterial to the wireless communication system. As mentioned, the WRAS may even be operated by third party other than the service provider, where the third party pays service subscription fees for each of the gateway and proxy radios as regular mobile stations. Essentially, as far as the fixed equipment network of the service provider is concerned, the gateway and proxy radios are simply other mobile stations. In this arrangement, mobile station 102 can call the WRAS in a manner similar to the way it would call any other mobile station, and is able to therefore send a voice signal or voice information to the WRAS, as well as receive voice signals from the WRAS, through the fixed equipment network.

Within the WRAS each of the gateway and proxy radios are connected to a controller and router 124 over a LAN 126, or equivalent connection. The router is connected to the internet, and supports communication with other devices connected to the internet. The router/controller 124 communicates with the gateway and proxy radios, including control and data information exchange. Signals received by each of the gateway and proxy radios over the air interface are forwarded to the controller. Likewise, the controller can forward or transmit information and signals to each of the gateway and proxy radios, so that it can be transmitted over the air interface to mobile station, by means of the fixed equipment network.

The wireless service provider may also provide direct internet connectivity to mobile stations via a mobile data gateway (MDG) 128, which connects the fixed equipment network 109 to the internet. The MDG facilitates packet data communication, and allows a mobile station to transact with servers and clients on over the Internet. This connection may also be used to supplement or aid communication with the WRAS, as will be discussed hereinbelow.

A first embodiment of the invention allows the user of a mobile station 102 to communicate with the user of a personal computer 104. The personal computer is provided with a virtual mobile station software client for emulating a mobile station. That is, the software can receive data sent over the internet, such as voice data from the WRAS, decode the data, and convert it to an audio signal where the computer's audio circuitry can play the audio signal for the user of the computer to hear. Similarly, the computer is provided with a microphone so that the virtual mobile station software can convert the computer user's voice signal into an appropriate digital format for transport over the internet, and forward the data to the WRAS over the internet.

In establishing a call between the mobile station 102 and the personal computer 104, the mobile station must first be provided with the calling number of the gateway radio 120. The calling number can be a phone number, for example, or a private dispatch identifier for simplex dispatch type communication. The mobile station must also be provided with a means of identifying the personal computer to which the user wishes to connect. There are a variety of ways this can be done, but for the present example, assume the personal computer has a fixed internet protocol (IP) address, which is known to the user of the mobile station 102, or which is stored in the mobile station. Since the call is not an ordinary call, the mobile station is provided with a means of facilitating an internet call, such as software for instantiating an internet call mode user-interface. This software may be implemented as a JAVA application, so that it may be developed and provided by a third party, such as the operator of the WRAS. In an internet call mode, the mobile station initiates a call differently than a typical call, where a typical call can be either a typical duplex phone call or a simplex dispatch call. Both means of calling include routing signals through the fixed equipment network. Once internet call mode has been initiated, the mobile station uses the calling number of the gateway radio 120 to call the gateway radio in typical fashion using the fixed equipment network. The mobile station calls the gateway radio 120, and upon establishing a connection, transmits the internet identity of the party with whom the user of the mobile station wishes to communicate. For the present example the mobile station provides the IP address of the personal computer 104, and the IP address is known beforehand. The gateway radio 120 forwards the request to the router 124, which forwards the request to over the internet, to the computer user's internet service provider's (ISP) equipment 130, which routes the information to the computer 104. The request is received by the virtual mobile station software, and an alert, equivalent to a phone ring, is given so that the user of the personal computer can accept the call. Once the call is accepted, the virtual mobile station software operating on the personal computer sends an acceptance message back to the WRAS over the Internet. At this point the mobile station 102 is still in internet call mode, waiting to commence communication, and the personal computer's virtual mobile station software is waiting for more information from the WRAS. Once the acceptance is received at the WRAS from the computer, the WRAS controller assigns the call to one of the proxy radios 122. As with the gateway radio, each proxy radio has its own unique calling number. The gateway radio then forwards the acceptance message back to the mobile station over the fixed equipment network and the air interface, and includes the calling number of the particular proxy radio to which the WRAS has assigned the call. At the same time the WRAS controller may inform the particular proxy radio selected to handle the call of the mobile station's call identifier, or other means of identification. Once the proxy radio calling number is received at the mobile station 102, the mobile station calls the proxy radio and commences communication. In the preferred embodiment, this is automated by the mobile station 102 so that the user does not need to take any action to establish a call to the proxy radio. This automation may be, for example, carried out by a JAVA application or program operating on the mobile station 102.

In the previous example it was assumed that the user of the mobile station knew the IP address, or equivalent, of the personal computer. More often this will not be the case because of dynamic address assignment used by internet service providers. Each time the personal computer accesses the Internet, it may be assigned a different IP address. To overcome this obstacle, a chat server 132 may be employed. The chat server allows clients to log in with an alias, and records the client's network address. By recording the present network address of the client, clients can access each other if they know the alias used by the client. The alias must therefore be unique within the domain serviced by the chat server.

According to the invention, when an alias system is employed, the personal computer 104 is provided with a chat client application program, including a virtual mobile station program that simulates the operation of a mobile station. The user of the personal computer provides an alias, which is used by the chat client application to register with the chat server 132 so that a mobile station, such as mobile station 102 can contact the user of the personal computer. When mobile station 102 initiates a call to the personal computer by calling the gateway radio, it transmits the alias used by the personal computer to register with the chat server, and the chat server address or domain name. The WRAS routes the request to the chat server, which in turn contacts the personal computer since it knows the present network address of the personal computer. The personal computer then responds. The call may then commence substantially as described before, and either the chat server can forward the network address to the WRAS to route signal information directly to the personal computer, or the call may commence using the chat server as an intermediary.

Alternatively, the mobile station 102 is provided with a chat application that can access the internet through the mobile data gateway 128 of the wireless communication system. The chat application may initiate the call by one of several alternative methods. The chat application would first query the chat server 132 to determine if the target computer is presently registered, or logged on, which indicates the personal computer's chat client is able to receive calls. One method involves querying the chat server for the present network address of the target personal computer, and using that network address to complete the call. That is, the mobile station 102 initiates a call to the gateway radio of the WRAS, and includes the present network address of the target personal computer. One skilled in the art will appreciate that the network address maybe an IP address presently assigned to the personal computer, or it may be, for example, the IP address of a gateway of the ISP 130 used by the personal computer, along with additional information so that the ISP equipment can route the data to the intended target personal computer.

The internet assisted mobile calling invention can be used to call other mobile stations. Calls between mobile stations are used when, for example, the mobile stations use different communication systems, or are located in different regions, or both. Using the invention, mobile stations may call other mobile stations anywhere in the world, provided there is a WRAS operating in the serving area of which the target mobile station is located. For example, a second WRAS 134 operates in the serving region of a second wireless communication system 136. The second WRAS is substantially equivalent to the first WRAS 118. The gateway and proxy radios employed by the second WRAS operate on the air interface employed by the second wireless communication system 136. The second wireless communication system may use the same air interface as the first wireless communication system, or it may use a different air interface, and may be operated by a different service provider.

To initiate a call to the second mobile station 106, the initiating mobile station 102 must know the calling number of the second mobile station, and it must have network information, or a network alias, or some other means of locating the second WRAS over the Internet. When the initiating mobile station calls the gateway radio, this information is transferred to the gateway radio, which in turn passes the information to the controller/router 124, and the controller/router transmits a request to the second WRAS, including the calling number of the target mobile station 106. When the request is received at the second WRAS, the controller 124 selects a proxy radio to conduct the call. The selected proxy radio calls the target mobile station over the second wireless communication system. The target mobile station may be located in the same serving cell as the WRAS, or it may be located in a different serving cell. At this point there is preferably a communication session established between the first and second WRAS, so when the target mobile station accepts the call, the signal received at the selected proxy radio from the target mobile station is immediately converted and routed to the first WRAS, where it is converted again, and transmitted to the initiating mobile station. In this manner the target mobile station requires no special software. The call between the selected proxy radio of the second WRAS and the target mobile station is performed the same way as a call between any two mobile stations in the second wireless communication system.

To initiate the call from the initiating mobile station 102 using the WRAS, the mobile station is provided with a means of interacting with the WRAS because the WRAS needs to have certain information to establish a communication session over the Internet with the intended target. There are two preferred ways of accomplishing this interaction. The first preferred way involves embedding the information in the signal transmitted to the gateway radio. Normally, once a call is established between two mobile stations, voice information is exchanged between them. That is, the users' voices at each radio are digitized, processed, encoded, and transmitted in discrete packets or frames. When these packets or frames are received, they are decoded, processed, and converted to an audio signal at the target mobile station. However, according to the invention, the initiating mobile station can place call information into the packets instead of voice information. In the preferred embodiment this call information would be placed onto an associated control channel that co-exists with the voice channel, allowing the voice channel to remain active while simultaneously allowing the call information data to be sent. The gateway radio is designed to expect such call information to be received, and instead of processing it as voice information, it extracts it and uses it to establish the desired internet assisted call. Likewise, when the gateway radio sends information back to the initiating mobile station, it substitutes control information for voice information. In this manner no change is needed at the fixed equipment network, and as far as it is concerned, the radios are engaged in a typical person to person call.

The software that performs the insertion of call information at the mobile station may be provided by the manufacturer of the mobile station, either as a standard feature, or as an optional feature. However, it is preferable that the software be developed as a portable application, such as, for example, a Java applet. Since the trend in mobile communication devices is to provide software environments where third party application can be loaded and safely executed, such as a Java environment, it is contemplated that the operator of a WRAS may develop and distribute the software needed to operate the mobile station in a way that automates the call set up process using the WRAS.

Figure 2:
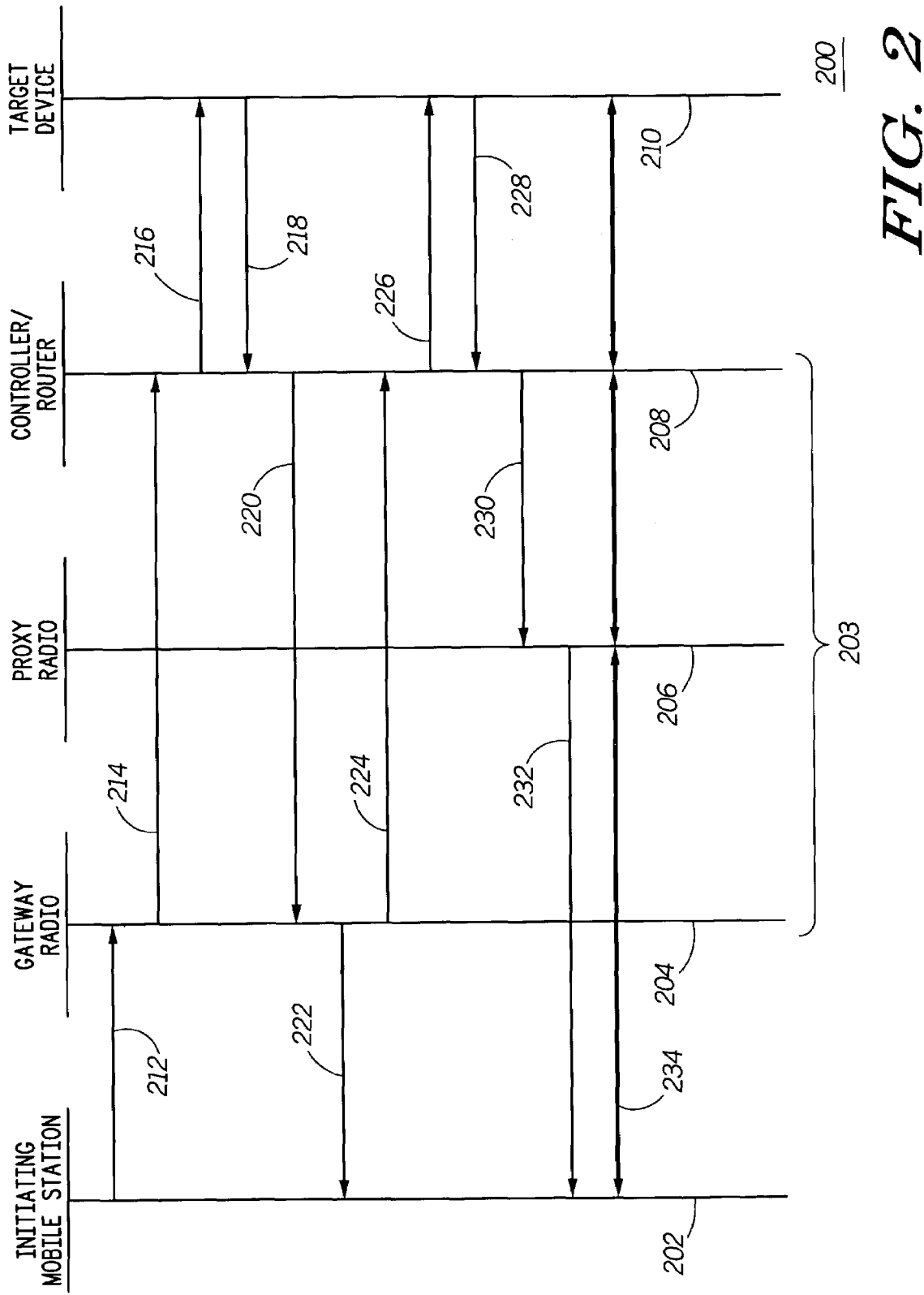
FIG. 2 shows a signal flow diagram of the essential signal flow in establishing an internet assisted mobile call, in accordance with the invention.

Referring now to FIG. 2, there is shown a signal flow diagram 200 illustrating the essential signal flow in establishing an internet assisted mobile call. When a user of a mobile station desires to make an internet assisted mobile call, the user operates the mobile station via its user interface to initiate an internet assisted mobile call, and the mobile station is then referred to a the initiating mobile station 202. The initiating mobile station first establishes a call via the wireless communication system with a WRAS 203. This is done by transmitting a request 212 from the initiating mobile station to the WRAS. The transmitting includes transmitting a target identifier of a target. The transmitting is performed through the fixed equipment network which provides wireless communication coverage in the area of both the mobile station and the WRAS. The request is received by the WRAS, and in particular that element of the WRAS designated to receive requests. In the preferred embodiment that element is the gateway radio 204. The WRAS, through the gateway radio in the preferred embodiment, interfaces with the fixed equipment network as any other mobile station which subscribes to communication service does. That is, the fixed equipment network of the wireless communication systems establishes a communication link between the initiating mobile station and the WRAS as it would in establishing a call between any two mobile stations. Within the WRAS, the element that receives the call and request message forwards (214) that request to the element of the WRAS that interfaces with the internet and control the operation of the WRAS, which the preferred embodiment is the controller/router 208. In the preferred embodiment the gateway radio performs this task. The WRAS then uses the information in the request to contact (216) the target device 210. The request information includes the network address necessary to contact the target device, and this may take the form of an IP address, a server IP address and an alias, or an alias and port number, and so on. The information provides the means by which the WRAS can connect with the internet entity that interfaces with the actual device that performs the communication function. Those skilled in the art will recognize there are a wide variety of ways the WRAS may contact a target device over a wide area network such as the Internet. It should also be noted that, as shown, the target device has been abstracted to a single entity, but in practice this may be several devices working together, such as a gateway with a personal computer, or a second WRAS operating with another wireless communication system. Both of these examples are discussed above in reference to FIG. 1.

When the target device responds affirmatively by transmitting (218), for example, a grant message, the WRAS informs the initiating mobile station that the target device has been reached and has responded affirmatively. Informing the initiating mobile station in the preferred embodiment comprises two tasks; first the controller transmits a message to the gateway radio (220). The gateway radio then transmits a message back to the initiating mobile station (222). Included in this message may be the identity of a proxy radio which will be used to carry out the actual call. Alternatively, the initiating mobile station may select an identifier, and the controller may directly assign a proxy radio to contact the mobile station without the use of the gateway radio. The proxy radio will transmit back the identifier selected by the initiating mobile station, and when the initiating mobile station receives the identifier it will recognize the call will be commencing with the selected proxy radio.

Once the initiating mobile station has been contacted, the WRAS controller is informed (224), and the WRAS then notifies the target device (226), which can reply (228) as being ready to commence the call. The controller then assigns (230) a proxy radio to carry out the call, which then initiates communication with the initiating mobile station (232). Then the call commences (234) in a relay fashion where communication commences between the initiating mobile station and the WRAS over the wireless communication system, and the WRAS and the target device over the internet.

Figure 3:
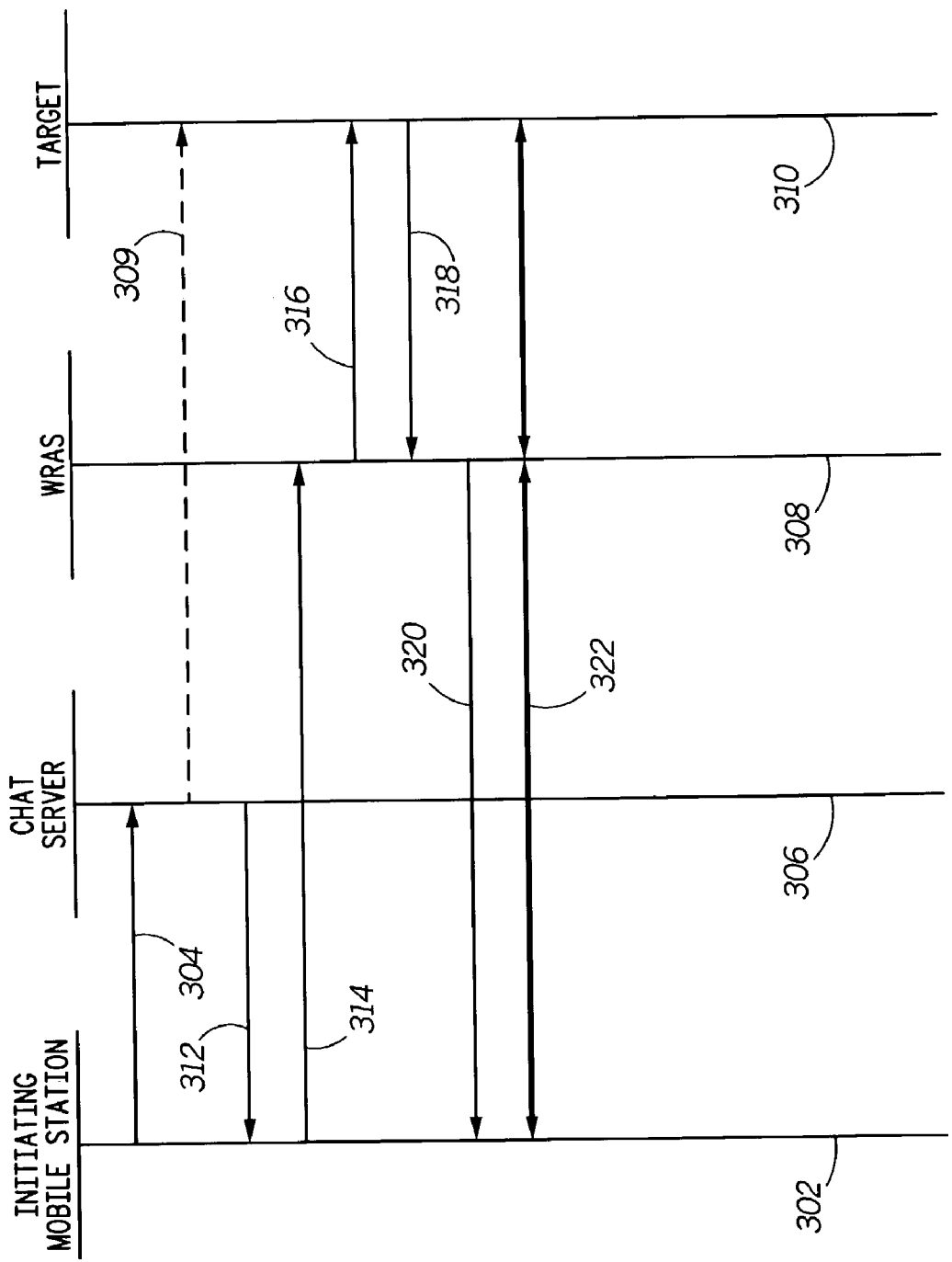
FIG. 3 shows a signal flow diagram illustrating a method of establishing an internet assisted mobile call, in accordance with the invention.

Referring now to FIG. 3, there is shown therein a signal flow diagram 300 illustrating a method of establishing an internet assisted mobile call, in accordance with the invention. The method illustrated here is an alternative method to that illustrated in FIG. 2, and takes advantage of an internet entity such as a chat server. As described previously, a chat server allows client applications to register for service, and thereby allow clients to communicate with each other. Typically a client registers with an alias so that other clients only need to know the alias used by the person with whom they wish to communicate. The chat server registers the present network address or addressing means necessary to communicate with each client.

According to one embodiment of the invention, the initiating mobile station 302 communicates (304) with the chat server 306. The connection between the initiating mobile station and the chat server is preferably performed via a packet data communication session, and is facilitated by the mobile data gateway, as described in reference to FIG. 1. Thus, the WRAS 308 is not needed for this task. The chat server may communicate (309) with the target 310 to verify the target is still available, or to see if it is available. It is assumed for this example that the target device is running a chat client program and is presently registered with the chat server. Once the initiating mobile station has contacted the chat server, it indicates the alias of the target entity the mobile station wishes to contact. The chat server responds (312) with a present network address of the target, if the target is also presently registered with the chat server for service. The initiating mobile station then makes a call to the WRAS (314) including the network address of the target. The WRAS in turn uses the address information to contact the target (316). The target responds with a message indicating whether it will accept the call (318). The WRAS then responds to the initiating mobile station, and informs the initiating mobile station of calling parameters, such as the calling number of a proxy radio. Finally, the call is set up between the initiating mobile station and the target (322).

Therefore the invention solves the problem by providing an efficient means by which mobile devices can use alternative networks, such as the Internet, to facilitate calling other parties. The invention provides for a wireless remote access server that interacts with a wireless mobile communication system in a manner consistent a typical subscribing mobile station. Other mobile stations can call the WRAS and request a network assisted call with a target entity. The WRAS provides connectivity to the wireless communication system and to the data network, and also translates the data as necessary.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of performing internet assisted mobile calling, comprising:

transmitting, from a mobile station to a gateway radio located at a wireless remote access server, a request to establish a communication link with a target, including transmitting a target identifier of the target, the transmitting being performed over an air interface of a wireless communication system providing wireless communication coverage in the area of both the mobile station and the wireless remote access server;

contacting the target via an internet communication session, performed by the wireless remote access server;

assigning a proxy radio, located at the wireless remote access , upon a response from the target, to be used to facilitate communication between the mobile station arid the target, the proxy radio having a proxy radio identifier;

transmitting the proxy radio identifier to the mobile station via the wireless communication system; and commencing communication between the mobile station and the target via the proxy radio.

2. A method of performing internet assisted mobile calling as defined by claim 1, where the step of contacting the target over the internet communication session comprises contacting a computer, connected to the internet, having a radio emulation client software application for facilitating communication.

3. A method of performing internet assisted mobile calling as defined by claim 1, wherein the wireless remote access server is a first wireless remote access server, the mobile station is a first mobile station located in a first serving region with the first wireless remote access server, the step of contacting the target over the internet communication session comprises contacting a second wireless remote access server located in a-second serving region of a second wireless communication system with the identifier of a second mobile station located in the second serving region.

4. A method of performing internet assisted mobile calling as defined by claim 1, wherein the wireless remote access server is a first wireless remote access saver, the mobile station is a first mobile station for use with a first wireless communication system, first wireless remote access server located in the serving region of the first wireless communication system, the step of contacting the target over the internet communication session comprises contacting a second wireless remote access server located in a serving region of a second wireless communication system with the identifier of a second mobile station for use in the second wireless communication system.

5. A method of performing internet assisted mobile calling at a wireless remote access server (WRAS), comprising:

receiving at the WRAS a request to establish a communication link from an initiating mobile station, the request including a target identifier of a target, the request being received over an air interface of a wireless communication system providing wireless communication service coverage in an area of both the initiating mobile station and the WRAS, the target identifier including a network address, wherein the WRAS operates as a subscriber of the wireless communication system in communicating with the wireless communication system, wherein: receiving the request is performed by a gateway radio of the WRAS;

establishing a communication session with a network entity connected to an information network and using the network address, the WRAS being operably connected to the information network;

forwarding the request to the internet entity, performed by the WRAS;

receiving a grant message from the internet entity at the WRAS;

transmitting a commence message to the initiating mobile station via the wireless communication system; and commencing a call whereby the initiating mobile station communicates to the network entity via a link formed through the-wireless communication system and the WRAS, wherein; commencing the call is performed by a proxy radio of the WRAS.

\* \* \* \* \*